US009259958B2

(12) United States Patent
Chernyshou

(10) Patent No.: US 9,259,958 B2
(45) Date of Patent: Feb. 16, 2016

(54) T-SQUARE

(71) Applicant: Stanley Black & Decker, Inc., New Britain, CT (US)

(72) Inventor: Aliaksei Chernyshou, Farmington, CT (US)

(73) Assignee: Stanley Black & Decker Inc., New Britain, CT (US)

( * ) Notice: Subject to any disclaimer, the term of this patent is extended or adjusted under 35 U.S.C. 154(b) by 166 days.

(21) Appl. No.: 13/967,556

(22) Filed: Aug. 15, 2013

(65) Prior Publication Data

US 2015/0047214 A1    Feb. 19, 2015

(51) Int. Cl.
| *B43L 7/02* | (2006.01) |
| *B25H 7/02* | (2006.01) |
| *B43L 7/12* | (2006.01) |
| *B43L 7/14* | (2006.01) |
| *G01B 3/04* | (2006.01) |
| *G01B 3/56* | (2006.01) |

(52) U.S. Cl.
CPC ... *B43L 7/02* (2013.01); *B25H 7/02* (2013.01); *B43L 7/12* (2013.01); *B43L 7/14* (2013.01); *G01B 3/04* (2013.01); *G01B 3/566* (2013.01)

(58) Field of Classification Search
CPC .............. B43L 7/02; B43L 7/027; B43L 7/12
USPC ............................................... 33/479, 42, 478
See application file for complete search history.

(56) References Cited

U.S. PATENT DOCUMENTS

| 306,418 | A | * | 10/1884 | Muller | 33/469 |
| 2,104,515 | A | * | 1/1938 | Golden | 33/479 |
| 2,477,724 | A | * | 8/1949 | Creain | 33/455 |
| 2,545,112 | A | * | 3/1951 | Sheridan | 33/468 |
| 4,525,933 | A | * | 7/1985 | Patterson | 33/470 |
| 4,825,559 | A | * | 5/1989 | Santos | 33/630 |
| 6,070,331 | A | * | 6/2000 | Dempsey | 33/42 |
| 6,141,882 | A | * | 11/2000 | Syken | 33/471 |
| 6,289,594 | B1 | * | 9/2001 | Wrobbel | 33/42 |
| 6,467,174 | B1 | | 10/2002 | Kotori | |
| 6,526,673 | B1 | * | 3/2003 | Reed | 33/761 |
| 6,612,035 | B2 | * | 9/2003 | Brown et al. | 30/292 |
| 6,763,603 | B2 | * | 7/2004 | Carrabino | 33/770 |
| 6,935,045 | B2 | * | 8/2005 | Cubbedge | 33/770 |
| 7,260,898 | B2 | * | 8/2007 | Snelson | 33/668 |
| 7,370,426 | B2 | * | 5/2008 | Choi | 33/42 |
| 7,484,313 | B1 | * | 2/2009 | Ogilvie | 33/770 |

(Continued)

FOREIGN PATENT DOCUMENTS

| EP | 2055444 A1 | 5/2009 |
| GB | 335560 A | 9/1930 |

OTHER PUBLICATIONS

Olivier Gerard, European Search Report, Feb. 13, 2015, The Hague.

(Continued)

*Primary Examiner* — Christopher Fulton
(74) *Attorney, Agent, or Firm* — Gabriel A. Haboubi

(57) ABSTRACT

A T-square for measuring and marking a panel comprises a housing; a rule mounted to the housing and arranged to engage a flat surface of a panel; a blade guide for receiving a blade, the blade guide mounted on the rule; and two moveable arms coupled to the housing and arranged to engage an edge of the panel.

14 Claims, 7 Drawing Sheets

(56) References Cited

U.S. PATENT DOCUMENTS

2005/0178014 A1* 8/2005 Tepei .............................. 33/42
2006/0156558 A1* 7/2006 Owens ............................ 33/42

OTHER PUBLICATIONS

Annex to the European Search Report on European Patent Application No. EP13187167.

* cited by examiner

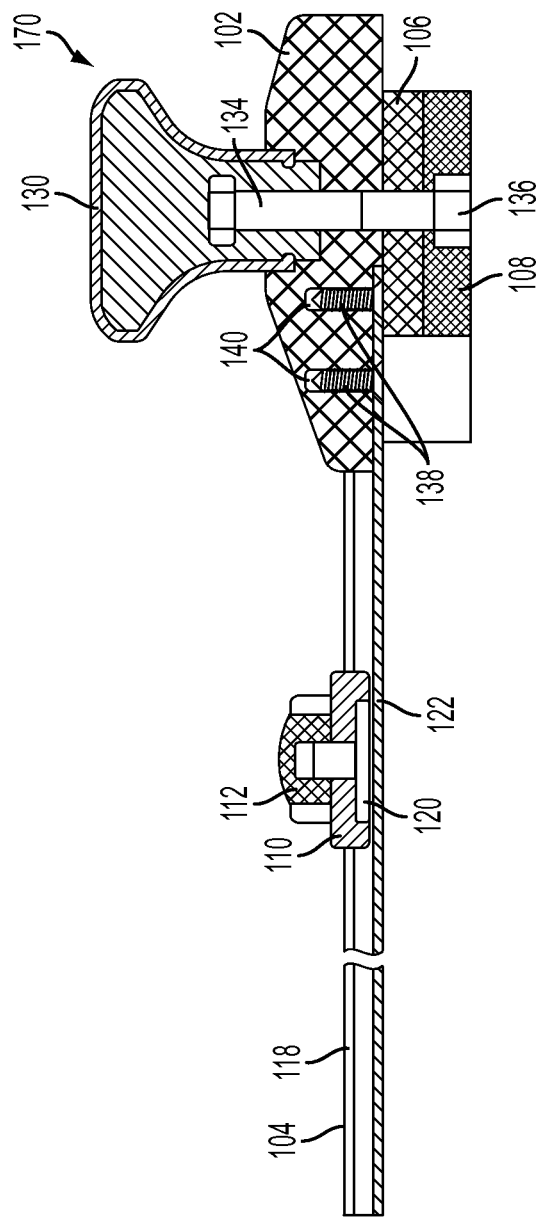

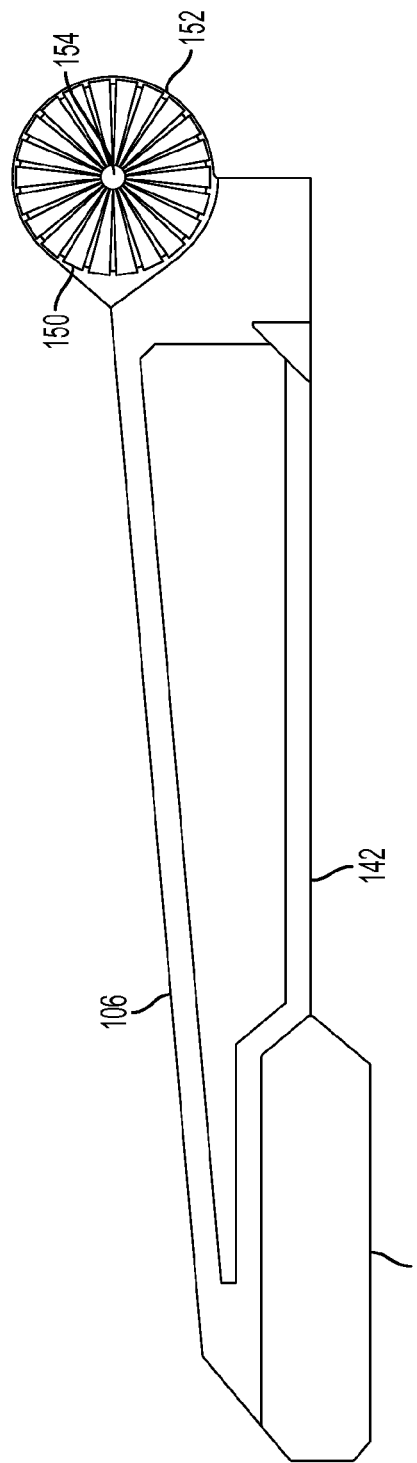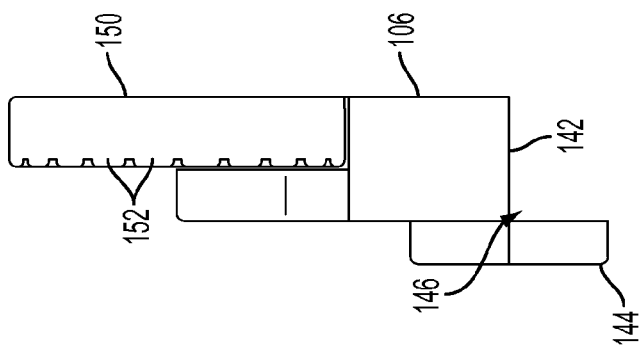

T-SQUARE

FIELD OF THE INVENTION

The present invention relates to a T-Square.

BACKGROUND OF THE INVENTION

With the current population growth in the world today there is great importance on constructing new buildings for a variety of purposes. New construction techniques often require efficient processes for a quicker build time. One such technique is to use drywall (also known as plasterboard) panels in the interior fitting of the building. The drywall panel provides a premade surface for the interior of the building which can be decorated with minimal treatment beforehand. One such use of drywall panels is in the interior layout of the building whereby interior walls are constructed from a lightweight timber frame and the drywall panels are fixed to the timer frame.

Drywall is manufactured in large rectangular panels but often smaller portions of drywall need to be cut to size. One method of cutting drywall is to score the drywall panel with a knife and then break the drywall along the scored mark. A known guide for scoring drywall is shown in U.S. Pat. No. 6,070,331 which shows an apparatus for scoring an marking having stabilizing wings. The apparatus comprises a flat elongate portion for resting on the flat panel and a base with a contact edge for engaging with the edge of the drywall panel. The contact edge can slide along the edge of the dry wall panel.

A problem with this apparatus is that the user cannot use the apparatus in a confined space. For example if the user attempts to make a score line along the drywall panel in a vertical direction when the panel is stacked vertically, the base of the apparatus engages the ground and prevents the user making a score line right up to the edge. In this case a user would have to cut the drywall in a different place or different orientation and carry the smaller portion back. This is tiresome and inconvenient for the user especially since some drywall panels are over 20 Kg in weight.

Embodiments of the present invention aim to address the aforementioned problems.

BRIEF SUMMARY OF THE INVENTION

According to an aspect of the present invention there is a T-square for measuring and marking a panel comprising: a housing; a rule mounted to the housing and arranged to engage a flat surface of a panel; a blade guide for receiving a blade, the blade guide mounted on the rule; and two moveable arms coupled to the housing and arranged to engage an edge of the panel.

This means that the T-square can be used in confined spaces because one of the arms can be moved whilst the other arm engages the edge of the panel. In this way the blade guide can be positioned right up to the edge of the panel even when the edge of the panel is adjacent the ground, a wall or any other object.

Preferably the two moveable arms are pivotable with respect to the housing. The two moveable arms may be fixedly moveable between a plurality of positions. Either one of the arms may be moved between a position whereby the arms are perpendicular to the rule and parallel to the rule.

Preferably the T-square comprises at least one stop member for stopping the movement of the two moveable arms. Preferably each of the two moveable arms comprise the at least one stop member. Preferably when the at least one stop member abuts the housing the respective moveable arm is perpendicular with respect to the rule. This means that when the user moves the arms such that one or more of the stop members engages the housing, the user knows that the arms are perpendicular to the rule. The stop member provides a predetermined position for the arms which is perpendicular to the rule. The user can then perform straight cuts with the T-square.

Preferably the two moveable arms each comprise reciprocal gripping portions for engaging each other and locking the two moveable arms with respect to each other. Each gripping portion may comprises a set of teeth interlockable with the other set of teeth on the other gripping portion. The two moveable arms are lockable with respect to the housing with a first locking knob. This provides a mechanism for the moveable arms to be securely locked in position with respect to the housing. At the same time the first locking knob allows the user to reposition and lock the arms as they require.

The blade guide may be moveable with respect to the rule. This allows the user to make cuts at different distances from the edge of the panel. Preferably the blade guide is lockable with respect to the rule with a second locking knob.

Preferably at least of the two moveable arms comprises a lip portion for engaging a flat surface of the panel. This helps keep the arms engaged with the edge portion of the panel.

Optionally the blade guide comprises a blade for scoring the panel. Alternatively the blade guide is suitable for receiving a blade in a knife.

Preferably each of the two arms are moveable independently of each other. This means that arms have the maximum number of different positions available.

BRIEF DESCRIPTION OF THE DRAWINGS

Various other aspects and further embodiments are also described in the following detailed description and in the attached claims with reference to the accompanying drawings, in which:

FIG. 4 shows a cross sectional side view of the T-square along the line A-A;
FIG. 5 shows a plan view of an arm of the T-square;
FIG. 6 shows an end on view of an arm of the T-square.

DETAILED DESCRIPTION OF THE INVENTION

Figure 1:
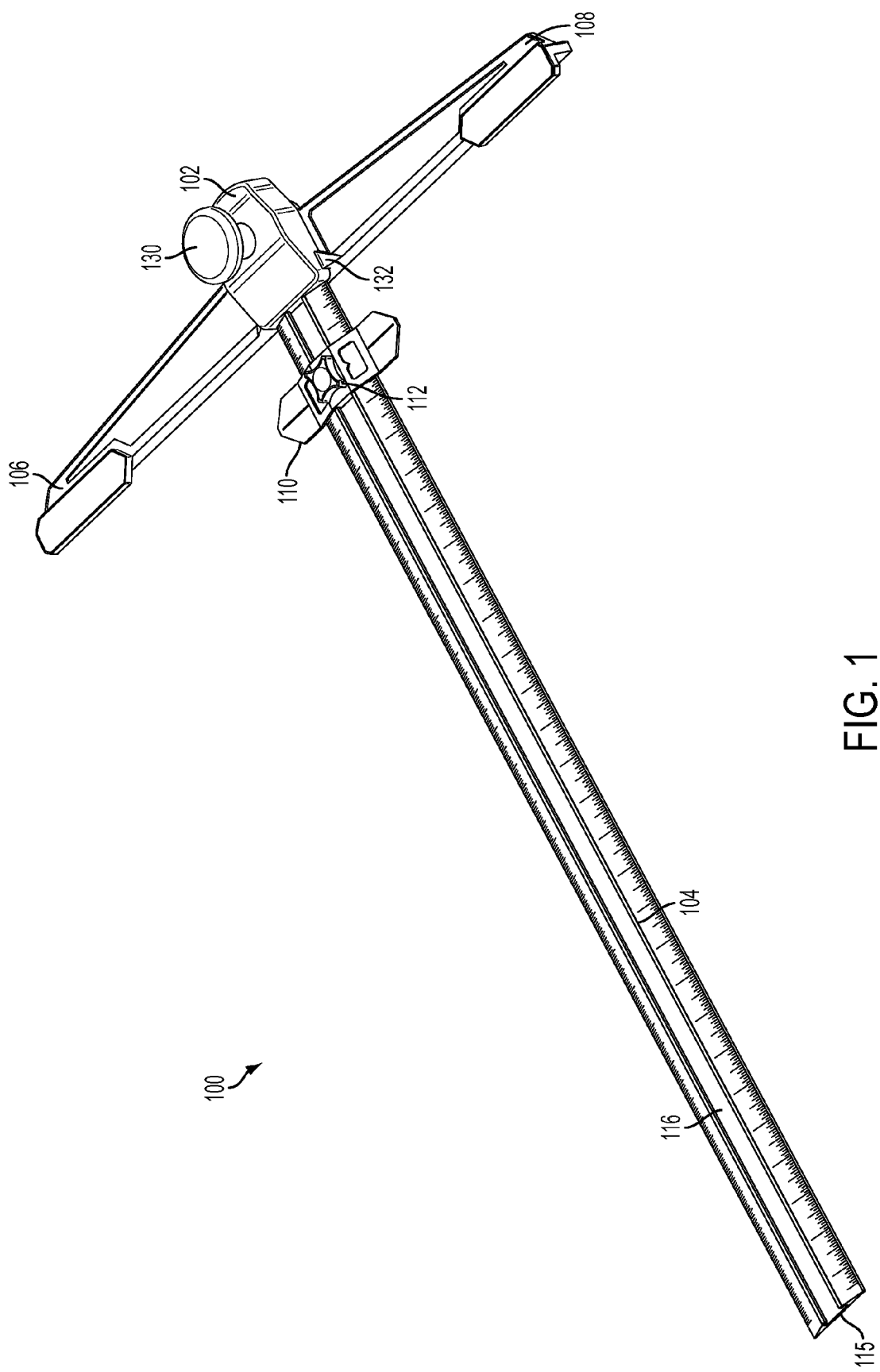
FIG. 1 shows a perspective view of a T-square.

FIG. 1 shows a perspective view of a T-square 100. The T-square 100 is an apparatus for guiding marking and scoring of a panel. In some instances the panel may be a drywall (also known as plasterboard) and the T-square 100 is used typically for guiding the marking and cutting of strips off a drywall panel. Typically the panel will have a flat planar surfaces and thin edges.

The T-square comprises a housing 102 and a rule 104 is mounted to the housing 102. The rule 104 is configured to engage a flat surface of the panel. A first moveable arm 106 and second moveable arm 108 are mounted on the housing 102. The first and second arms 106, 108 ware configured to engage with the thin edge of the panel. In some embodiments the first and second moveable arms 106, 108 are pivotally mounted with respect to the housing 102. The first and second arms 106, 108 are locked in position with respect to the housing 102 with a first locking knob 130.

The first and second arms 106, 108 are lockable by a first locking knob 130. The first locking knob 130 locks the position of the first and second arms 16, 108 with respect to the housing 102 in a first position. In a second position the first locking knob 130 releases the first and second arms 106, 108 and the first and second arms 106, 108 are moveable with respect to the housing 102. In some embodiments the first locking knob 130 actuates a locking mechanism 170 for locking the position of the first and second arms 106, 108 with respect to the housing 102. The locking mechanism 170 can be any means suitable for locking the position of the first and second arms 106, 108 with respect to the housing 102.

In some embodiments the rule 104 is fixed with respect to the housing 102. The rule 104 is fixed to the housing 102 with screws 138 fastened into holes 140 in the housing 102 as shown in FIG. 4. In other embodiments the rule 104 can be fixed to the housing with any other means suitable for fixing the housing 102 and the rule together.

Figure 2:
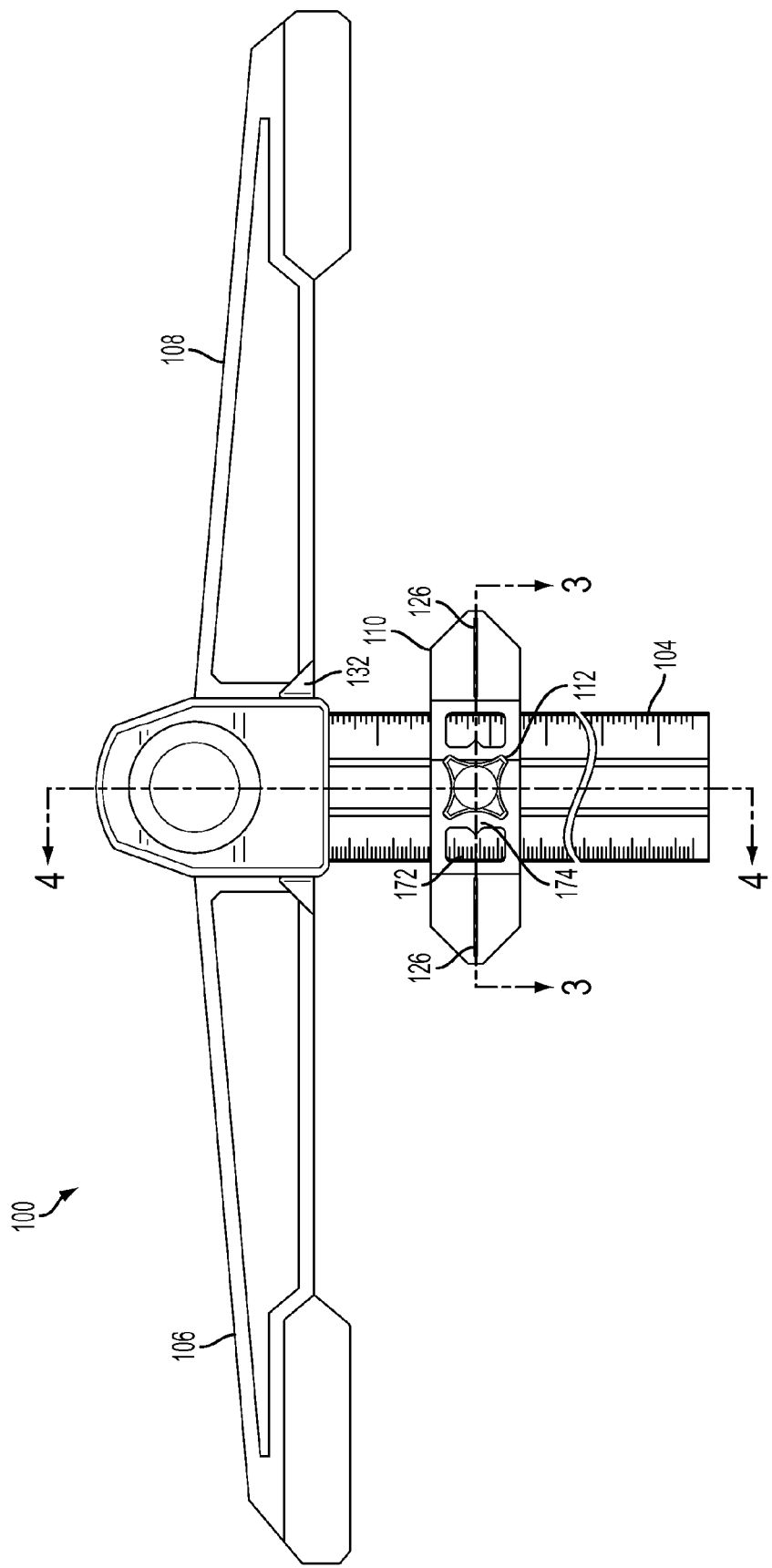
FIG. 2 shows a plan view of the T-square.

A blade guide 110 is moveably mounted on the rule 104. Turning to FIG. 2, the blade guide 110 and rule 104 will be discussed in more detail. FIG. 2 shows a plan view of T-square 100. For the purposes of clarity the rule 104 is partially shown. The rule 104 comprises indicia for measuring the depth or width of a panel. In some embodiments the rule may be the length of half a dimension of a drywall panel. The rule 104 may be half the length or half the width of a panel. By being half the length or width of a panel, the rule can be used to cut a strip off a panel along the full length or width of the panel in two operations. In some embodiments the rule 104 may be 700 mm long.

The blade guide 110 is mounted on the rule 104 and is moveable with respect to the rule 104. The blade guide 110 comprise slots 126 for receiving a blade (not shown). The blade guide 110 also comprises windows 172 and a indicia marker 174 for reading the measured position of the blade guide 110. The indicia marker 174 is in line with the blade slots 126. In some alternative embodiments the slots 126 can be mounted with a blade for scoring the panel. The blade slots 126 are perpendicular to the longitudinal axis of the rule 104.

Figure 3:
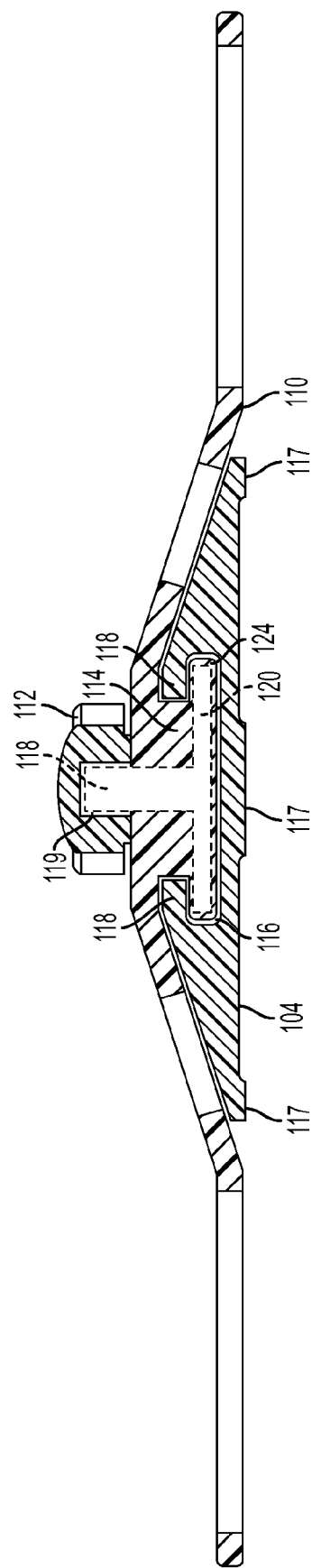
FIG. 3 shows a cross sectional view of the T-square along the line B-B.

The rule 104 has a generally trapezoidal cross section. The blade guide 110 sits over the rule 104 and has a cross section which reciprocates the cross section of the rule 104. The blade guide 110 sits flush against the rule 104 when the blade guide 110 is mounted on the rule 104. This can be better seen from FIG. 3. FIG. 3 shows a cross sectional view of the rule 104 and the blade guide 110 along the line B-B. The rule 104 comprises a flat surface engaging members 117 for engaging the flat surface of the panel.

The blade guide 110 comprises a foot 114 having a flange 124. The foot 114 is mounted within a longitudinal groove 116 in the rule 104. The longitudinal groove 116 extends along the entire length of the rule 104. The longitudinal groove 116 comprises overhangs 118. The overhangs 118 prevent the flange 124 of the foot 114 from moving in a direction perpendicular to the longitudinal axis of the groove 116. In other words the foot 114 can only move along the longitudinal groove 116 and the blade guide 110 cannot be pulled away from the rule 104. In this way the foot 114 of the blade guide 110 is inserted and removed into the longitudinal groove 116 only from either end of the rule 104. In some embodiments only one end 115 of the rule 104 is open and the foot 114 can only be inserted at the open end 115. The blade guide 110 comprises a second locking knob 112 which is mounted on a threaded shaft 118 of on a plate member 120.

The second locking knob 112 comprises an integral nut 119 which threads onto the threaded shaft 118. The threaded shaft 118 and the plate member 120 are shown in FIG. 3 with a dotted outline for the purposes of clarity.

Briefly turning to FIG. 4 which shows a cross section of the T-square along line A-A, the plate member 120 sits within a recess 122 on the underside of the blade guide 110. The plate member 120 sits flush within recess 122 and the plate member 120 extends underneath the overhangs 118 to the same extent as the flange 124 of the foot 114. The blade guide 110 is locked position with respect to the rule by screwing the second locking knob 112 tight on the threaded shaft 118. As the second locking knob 112 is tightened, the plate member 120 is urged against the overhangs 118 and the blade guide 110 is clamped against the rule 104. The user loosens and tightens the second locking knob 112 when the user needs to move the blade guide 110 along the rule 104.

The first and second moveable arms 104, 108 will now be discussed in further detail. FIGS. 1 and 2 shows the first arm 106 and the second arm 108 both in a deployed position. In the deployed position the first arm 106 and the second arm 108 are substantially perpendicular with the rule 104. Each arm comprises a stop member 132. FIG. 2 shows the stop member 132 on the second arm 108. The first arm 106 also comprises an identical stop member 132, but this is not visible in FIG. 2. The stop member 132 of each arm 106, 108 is configured to abut the housing 102 when the arms 106, 108 are perpendicular to the rule 104. The stop members 132 limit the pivotal movement of the first and second arms 106, 108 and prevent the first and second arms 16, 108 moving any closer to the rule 104 than when the arms are perpendicular to the rule 104 as shown in FIGS. 1 and 2.

In this way the stop members 132 provide a predetermined reference point for positioning the moveable arms 106, 108 perpendicular to the rule 104.

The first and second arms 106, 108 are pivotally mounted to the housing 102 with a bolt 134. The first locking knob 130 is fixed and mounted to the head of the bolt 134. In this way when the first locking knob 130 is rotated with respect to the housing, the bolt 134 also rotates. The bolt 134 comprises a threaded portion which threads into a reciprocal nut 136 mounted and fixed to the second moveable arm 108. The first moveable arm 106 is threaded on to the bolt 134 and sandwiched between the second moveable arm 108 and the housing 102. When the first locking knob 130 is tightened, the nut 136 draws the second moveable arm 108 towards the housing 102 and clamps the first moveable arm 106 to the housing 102. In other embodiments the first locking knob 130 can comprise the nut 136 and the bolt 134 can be mounted in the second moveable arm 108.

In some other embodiments the first locking knob 130 can actuate an alternative locking mechanism. For example, the first locking knob 130 can actuate a latch which compresses the first and second arms 106, 108 together, preventing movement therebetween. In some other embodiments there may be any locking mechanism for preventing movement between the first and second arms 106, 108.

FIG. 5 shows a plan view of the first moveable arm 106. FIG. 6 shows an end on view of the first moveable arm 106 shown in FIG. 5. The first moveable arm 106 is a general triangular shape, but the arm 106 can be any shape which is suitable for engagement with the edge of a panel. The first moveable arm 106 comprises an engagement surface 142 for engaging the edge of a panel. The engagement surface 142 is arranged to slide along the edge of the panel. The arm 106 comprises a lip portion 144 for engaging the flat surface of a panel. The lip portion 144 is configured to extend over the corner between the edge of the panel and the flat surface of the panel. In this way a corner of the panel engages with the vertex 146 between the engagement surface 142 and the lip portion 144. The lip portion 144 makes a better connection between the T-square 100 and the edge of the panel and helps keep the arms 106, 108 in line with the edge of the panel.

The first arm 106 comprises a gripping portion 150 having a plurality of teeth 152. The gripping portion 150 comprises a substantially disc shaped element with teeth 152 which comprise radial ridges circumferentially position around the disc. The gripping portion 150 is configured to engage with a similar reciprocal gripping portion on the second arm 108. The gripping portion 150 comprises a hole 154 through which bolt 134 protrudes. The second moveable arm 108 is substantially identical to the first moveable arm 106. The teeth of the gripping portion 150 of the first arm 106 are configured to interlock with the teeth of the gripping portion of the second arm 108. The interlocking teeth 152 increase the friction between the first and second moveable arms 106, 108 and prevent the first and second moveable arms 106, 108 moving with respect to each other when the first locking knob 130 is tightened.

Figure 8:
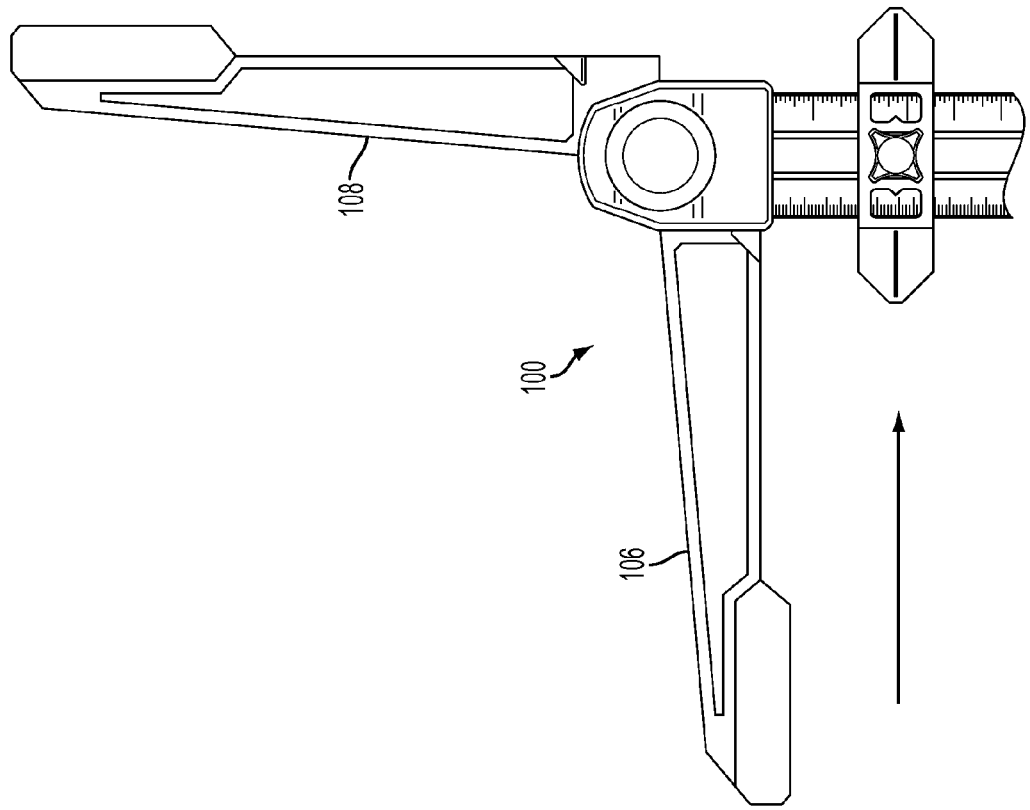
FIG. 8 shows the T-square in another position.
Figure 7:
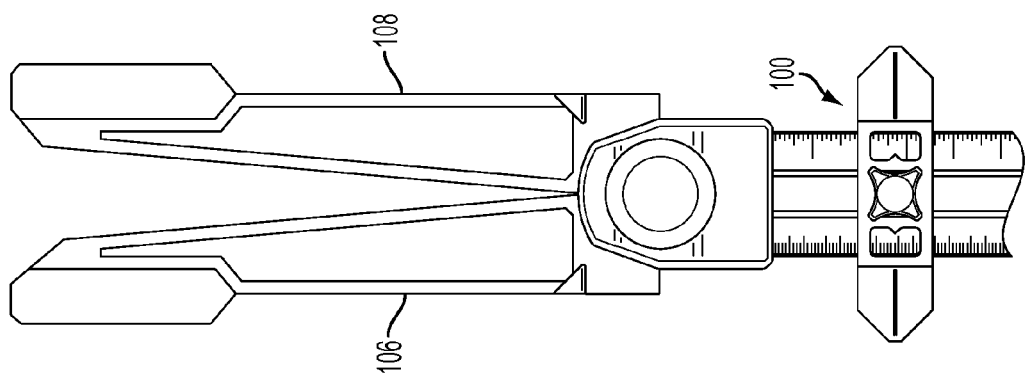
FIG. 7 shows the T-square in one position.

Operation of the T-square will now be briefly discussed in reference to FIGS. 1, 7 and 8. FIGS. 7 and 8 show plan views of the T-square with the moveable arms in different positions.

FIG. 1 shows the first and second arms 106, 108 of the T-Square 100 perpendicular to the rule 104. In this position both the engaging surfaces 142 of the first and second arms 106, 108 will engage with the edge of a panel. At the same time the rule 104 will engage with the flat surface of the panel. The user will adjust the blade guide 110 so that the blade guide is at a desired position from the edge of the panel. The user will then insert a blade into the blade slot 126 and slide the T-square 100 along the panel. As the T-square 100 slides over the panel, the first and second arms 106, 108 will slide along the edge of the panel. At the same time the rule will slide over the flat surface of the panel and the blade will score a line as defined by the first and second arms 106, 108 following the edge of the panel.

In some circumstances, the user may find that the panel to be cut is in a confined space, or an object is in the way preventing an up to the edge cut with both the arms in the deployed position as shown in FIG. 1. If this happens, then the user loosens the first locking knob 130, pivots the arm which will be inhibited by the object at the edge of the panel and then retightens the locking knob 130. Referring to FIG. 8, an object is in the way to the right of the T-square 100 and the second arm 108 has been pivoted to a position wherein the second arm is upright and parallel with the rule 104. In this position the T-square 100 can be slid towards the object on the right. The T-square can be slid along the edge of a panel right up to the edge of the panel without the second arm 108 interfering with the T-square. This means that the functionality of the T-square can be achieved even in scenarios where one arm may get in the way. In particular the T-Square 100 can be used making a vertical cut towards the ground and the T-Square is not impeded by the ground. Each of the first and second arm 106, 108 can be positioned at a plurality of positions between a position whereby the arm 106, 108 is perpendicular to the rule 104 and a position whereby the arm is parallel with the rule 104.

FIG. 7 shows the T-Square 100 with both the first arm 106 and the second arm 108 in a raised position. This allows for the T-Square 100 to be stored more easily when not in use.

Figure 9:
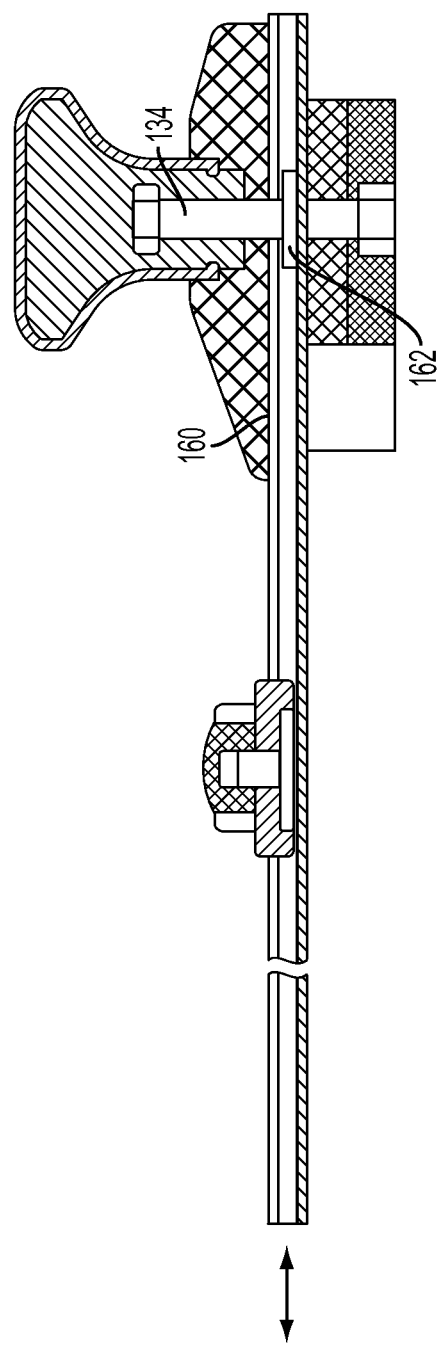
FIG. 9 shows an alternative embodiment of the T-square.

In some alternative embodiments the housing 102 is moveable with respect to the rule 104 in a similar manner to the blade guide 110 as shown in FIG. 9. In this case the housing 102 comprises a through hole 160 for receiving the rule 104. Instead of being screwed to the housing 102, the rule 104 is clamped to the housing 102 using the same clamping force to clamp the second arm 108 and the first arm 106 to the housing 102. A second plate member 162 is threaded on the bolt 134 and is mounted in the longitudinal groove 116 similar to the first plate member 120. When the first and second arms 106, 108 are clamped to the housing, the rule 104 is also clamped to the housing 102. In order to facilitate the movement of the rule 104 past the bolt 134, the bolt 134 is mounted in a slot (not shown) in the rule 104. The slot may extend part way along the rule 104.

In other embodiments the first and second moveable arms 106, 108 can move with other degrees of freedom, for example the arms 106, 108 may be configured to slide with respect to the housing 102.

Embodiments of the present invention have been discussed with particular reference to the examples illustrated. However it will be appreciated that variations and modifications may be made to the examples described within the scope of the invention.

The invention claimed is:

1. A T-square for measuring and marking a panel comprising:
    a housing;
    a rule mounted to the housing and arranged to engage a flat surface of a panel;
    a blade guide for receiving a blade, the blade guide mounted on the rule; and
    two moveable arms coupled to the housing and arranged to engage an edge of the panel;
    wherein each of the two arms are moveable independently of each other.

2. A T-square according to claim 1, wherein the rule has a fixed length
    and wherein the blade guide is mounted to the rule so as to be positioned on the rule at one or more places along the fixed length.

3. A T-square according to claim 1 wherein the two moveable arms are pivotable with respect to the housing.

4. A T-square according to claim 1 wherein the two moveable arms are fixedly moveable between a plurality of positions.

5. A T-square according to claim 1 wherein the T-square comprises at least one stop member for stopping the movement of the two moveable arms.

6. A T-square according to claim 5 wherein each of the two moveable arms comprise the at least one stop member.

7. A T-square according to claim 6 wherein when the at least one stop member abuts the housing the respective moveable arm is perpendicular with respect to the rule.

8. A T-square according to claim 1 wherein the two moveable arms each comprise reciprocal gripping portions for engaging each other and locking the two moveable arms with respect to each other.

9. A T-square according to claim 8 wherein each gripping portion comprises a set of teeth interlockable with the other set of teeth on the other gripping portion.

10. A T-square according to claim 1 wherein the two moveable arms are lockable with respect to the housing with a first locking knob.

11. A T-square according to claim 1 wherein the blade guide is moveable with respect to the rule.

12. A T-square according to claim 11 wherein the blade guide is lockable with respect to the rule with a second locking knob.

13. A T-square according to claim 1 wherein at least one of the two moveable arms comprise a lip portion for engaging a flat surface of the panel.

14. A T-square according to claim 1 wherein the blade guide is configured for scoring the panel.

* * * * *